United States Patent
Liu et al.

(10) Patent No.: US 11,860,939 B2
(45) Date of Patent: Jan. 2, 2024

(54) MANIPULATING A TABLE WITH AN XML COLUMN IN A DATABASE

(71) Applicant: INTERNATIONAL BUSINESS MACHINES CORPORATION, Armonk, NY (US)

(72) Inventors: Xin Peng Liu, Beijing (CN); Shuo Li, Beijing (CN); Xiaobo Wang, Beijing (CN); ShengYan Sun, Beijing (CN); Kwai Hing Man, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 16/407,220

(22) Filed: May 9, 2019

(65) Prior Publication Data
US 2020/0356594 A1 Nov. 12, 2020

(51) Int. Cl.
*G06F 16/832* (2019.01)
*G06F 16/81* (2019.01)
(Continued)

(52) U.S. Cl.
CPC .......... *G06F 16/832* (2019.01); *G06F 16/221* (2019.01); *G06F 16/2282* (2019.01); *G06F 16/81* (2019.01); *G06F 16/8373* (2019.01)

(58) Field of Classification Search
CPC ...... G06F 16/221; G06F 16/81; G06F 16/832; G06F 16/8373; G06F 16/2282
See application file for complete search history.

(56) References Cited

U.S. PATENT DOCUMENTS 7,174,327 B2 * 2/2007 Chau ................ G06F 16/86
8,200,668 B2 6/2012 Carlin
(Continued)

FOREIGN PATENT DOCUMENTS

WO WO-2007108858 A1 * 9/2007 ............ G06F 16/40

OTHER PUBLICATIONS

Author: Oracle XML DB Team, Oracle XML DB: Best Practices to Get Optimal Performance out of XML Queries, Jan. 2013, https://www.oracle.com/technetwork/database/features/xmldb/xmlqueryoptimize11gr2-168036.pdf, pp. 7-8 (Year: 2013).*
(Continued)

*Primary Examiner* — Hosain T Alam
*Assistant Examiner* — Anthony G Gemignani
(74) *Attorney, Agent, or Firm* — Tihon Poltavets

(57) ABSTRACT

Embodiments of the disclosure provide methods, systems, computer program products for manipulating a table with an XML column in database. According to the method, a SQL statement for a table is received first, wherein the table comprises an XML column which is a representation of a plurality of logical columns of the table, there is at least one XML element in at least one row and in the XML column of the table, and each of the at least one XML element corresponds to a non-null value in a specific row and in a logical column of the plurality of logical columns of the table. Then the SQL statement is parsed. And then the SQL statement is transformed into a hybrid statement being able to process the XML column in response to the parsing result indicating that the SQL statement relates to at least one logical column of the plurality of logical columns. At last the hybrid statement is executed.

20 Claims, 5 Drawing Sheets

(51) Int. Cl.
*G06F 16/22* (2019.01)
*G06F 16/835* (2019.01)

(56) References Cited

U.S. PATENT DOCUMENTS

| | | | | |
|---|---|---|---|---|
| 9,390,115 B2 | 7/2016 | Liu | | |
| 2008/0249972 A1* | 10/2008 | Dillon | ............. | G06F 16/252 |
| | | | | 706/46 |
| 2009/0319487 A1* | 12/2009 | Carlin | ............. | G06F 16/288 |
| | | | | 707/999.102 |
| 2011/0296321 A1* | 12/2011 | Lord | ............. | G06Q 10/10 |
| | | | | 707/769 |
| 2013/0290300 A1* | 10/2013 | Chen | ............. | G06F 16/217 |
| | | | | 707/722 |

OTHER PUBLICATIONS

Author: Avinash Navlani, Group By and Having Clause in SQL, Jan. 30, 2019, https://www.datacamp.com/community/tutorials/group-by-having-clause-sql (Year: 2019).*

Jane Man, XMLModify function: sub-document update on an XML document, Sep. 14, 2015, IDUG, https://www.idug.org/browse/blogs/blogviewer?BlogKey=fac72bc2-b607-4860-ab8b-266e5e6d0a91 (Year: 2015).*

Mell et al., "The NIST Definition of Cloud Computing", National Institute of Standards and Technology, Special Publication 800-145, Sep. 2011, pp. 1-7.

* cited by examiner

MANIPULATING A TABLE WITH AN XML COLUMN IN A DATABASE

BACKGROUND

Embodiments of the present disclosure relate to databases and, more specifically, to manipulating a table with an XML column in a database.

Data within a relational database is organized via one or more tables and the tables are arranged as an array of rows and columns, while data within an XML database is organized via documents in XML format. Queries to tables in the relational database use Structured Query Language (SQL) query while queries to XML documents in the XML database use XQuery. A database engine allows users to manipulate data in the database directly or through a database application so that useful information can be generated from the data.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an aspect, a method for manipulating a table with an XML column in database is disclosed. According to the method, an SQL statement for a table is received first, wherein the table comprises an XML column which is a representation of a plurality of logical columns of the table, there is at least one XML element in at least one row and in the XML column of the table, and each of the at least one XML element corresponds to a non-null value in a specific row and in a logical column of the plurality of logical columns of the table. The SQL statement is then parsed, and the SQL statement is transformed into a hybrid statement able to process the XML column in response to the parsing result indicating that the SQL statement relates to at least one logical column of the plurality of logical columns. At last, the hybrid statement is executed.

In another aspect, a computer-implemented system is disclosed. The system may include a computer processor coupled to a computer-readable memory unit, said memory unit comprising instructions that when executed by the computer processor implements the above method.

In yet another aspect, a computer program product is disclosed. The computer program product comprises a computer readable storage medium having program instructions embodied therewith. When executed on one or more processors, the instructions may cause the one or more processors to perform the above method.

BRIEF DESCRIPTION OF THE SEVERAL VIEWS OF THE DRAWINGS

Through the more detailed description of embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
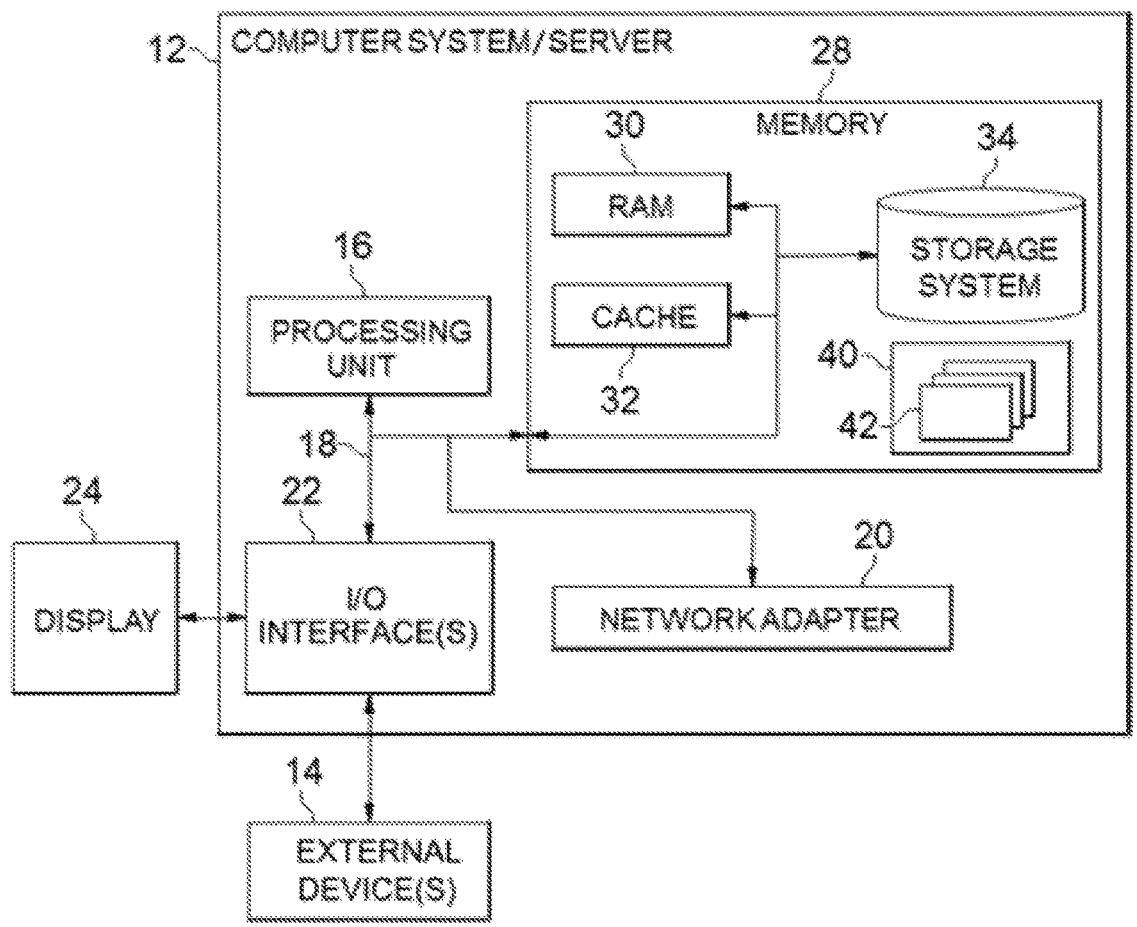
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
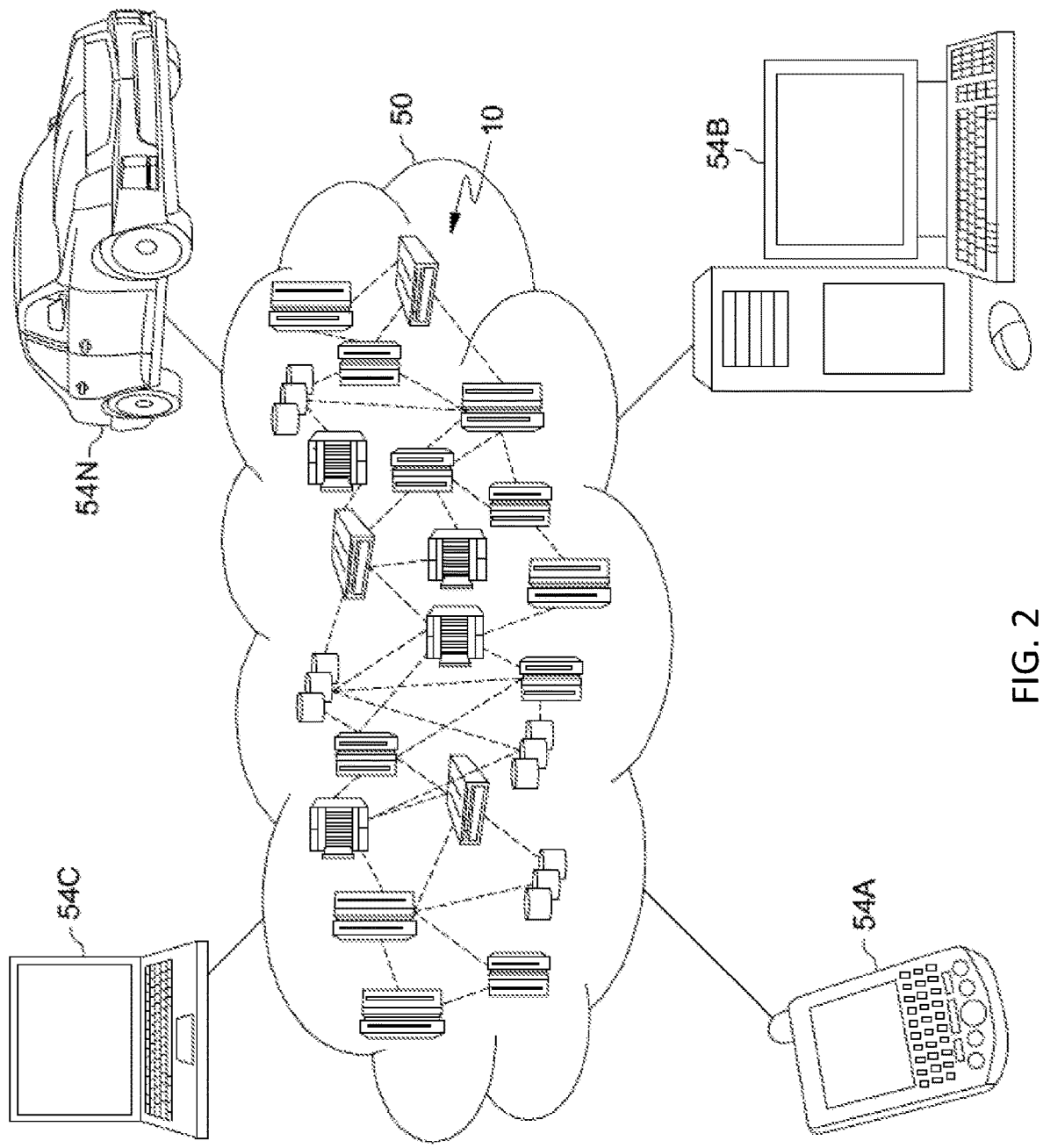
FIG. 2 depicts a cloud computing environment according to an embodiment of the present disclosure.

Referring now to FIG. 1, a schematic of an example of a cloud computing node is shown. Cloud computing node 10 from FIG. 2 is only one example of a suitable cloud computing node and is not intended to suggest any limitation as to the scope of use or functionality of embodiments of the disclosure described herein. Regardless, cloud computing node 10 from FIG. 2 is capable of being implemented and/or performing any of the functionality set forth hereinabove.

In cloud computing node 10 from FIG. 2 there is a computer system/server 12 or a portable electronic device such as a communication device, which is operational with numerous other general components or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
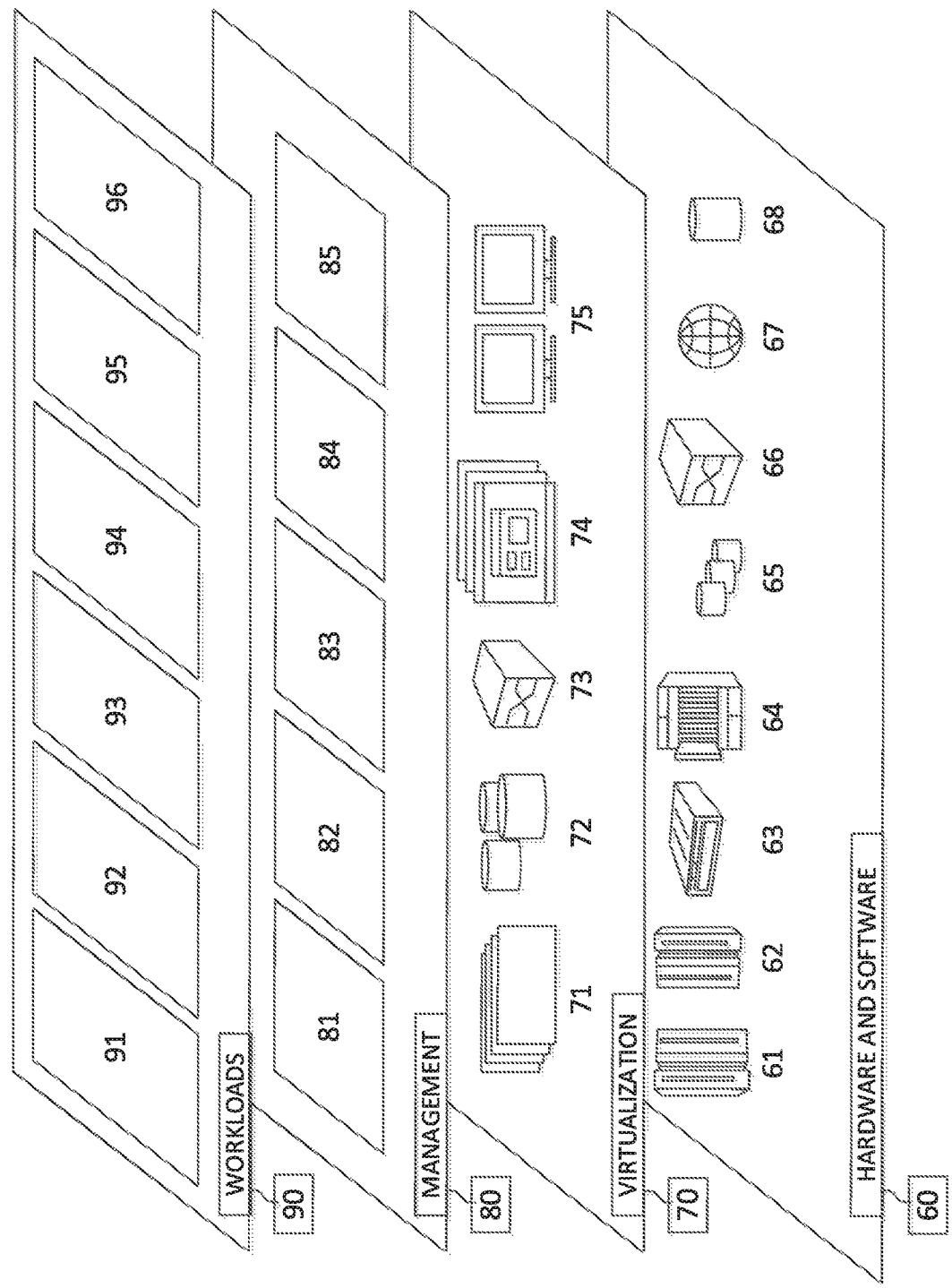
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and table manipulating 96.

In a relational database, different types of data can be stored in a single table. These tables contain data that have different properties that apply to different subsets of rows in the table. In some cases, some tables may change their schemas frequently by adding columns with a few row values, which make these tables contain columns that are populated with values for only a subset of rows. For example, Table 1 shows an example table including sparse columns (e.g., columns having a substantial percentage of rows with null values) with NULL values for most of the rows. This kind of table may be full of "holes", and each page of the table in the database storage may contain a lot of NULL values, which makes the performance of both database storage and database query decrease.

TABLE 1

| Patient ID | Patient name | Gender | Age | Platelet | cholesterol | leukocyte | blood pressure | vision |
|---|---|---|---|---|---|---|---|---|
| 1111 | Jack | Male | 30 | | X | X | | |
| 2222 | Tom | Male | 34 | | | X | | |
| 3333 | Jill | Female | 27 | X | | | X | X |
| ... | | | | | | | | |

In a solution, these sparse columns with NULL values for most of the rows are organized into column sets that can be treated as a single entity. However, the data storage employs a set of basic building blocks for creating and managing rich, persisted objects and links between objects, these objects can be buried in files. And an extended SQL is used for query for such data to simplify users' queries. However, when the database engine accesses such data in the database storage, the access may involve multiple I/O operations because the data may be stored in multiple pages in the storage. And JOIN operations may be needed since query results of each I/O need to be combined, which may make performance of the database decreased.

In this invention, the above column sets are not organized into a single entity. Instead, the column sets are a special column which is representation of a plurality of logical columns of the table. The special column is referred to as an XML column hereafter. All data, either in the XML column or in other columns, are organized in the table. A value type of the XML column is XML which is new type of content (XML type). There is at least one XML element in at least one row and in the XML column of the table. The at least one XML element in a specific row and in the XML column of the table is a value in the specific row and in the XML column of the table similar to a string representation, a binary representation, a single binary scalar and the like in a table of a database. Each of the at least one XML element in the specific row and in the XML column of the table corresponds to a non-null value in the specific row and in a logical column of the plurality of logical columns of the table. The at least one element in the specific row and in the XML column of the table and values in the specific row and in other columns of the table are stored in the same table space in a database storage, such as disk, magnetic type, and the like, thus when a query request is received by a database engine, pages loaded from the database storage may comprise more rows values and the JOIN operation is not needed because the data in all columns are in the same pages Such table structure permits optimization of storage for the plurality of logical columns by storing only non-null values in XML elements, and also makes performance of queries improved by omitting the JOIN operation.

For example, a table in a rational database is designed to contain six columns, e.g. C1, C2, C3, C4, C5 and C6, in which C1, C2 and C3 are general columns in which elements in a specific row of the table are represented by a value such as a string representation, a binary representation, a single binary scalar and the like, while C4, C5 and C6 are sparse columns with NULL values for most (not all) of the rows. According to this disclosure, the columns C1, C2 and C3 are still general columns of the table and the columns C4, C5 and C6 can be re-organized as an XML column of the table, shown as Table 2 below. The Table 2 can be created with four columns, e.g. C1, C2 and C3 and an XML column referred as XML_Col. There are multiple XML elements in a specific row and in the XML column XML_Col of the Table 2 representing non-NULL values in the specific row and in the columns C4, C5 and C6, which referred as logical columns, of the Table 2. It can be understood that a new type of contents in the XML column of the new created table, e.g. XML elements, is introduced in this invention. For example, in the following Table 2, there is one XML element in the first row and XML column and there are two XML elements in the second row and in the XML column of the Table 2. In other words, an XML element in the XML column in the table corresponds to a non-null value in a logical column of the table. For example, the elements in the first and second rows and in the XML column of the Table 2 represent that a value in the first row and in the logical column C4 is "hello", and values in the second row and in the logical columns C5 and C6 are "Good" and "Well" respectively. And the XML column can be queried, inserted or updated similar to any other general columns.

TABLE 2

| C1 | C2 | C3 | XML_Col |
|----|----|----|---------|
| ... | ... | ... | <row><br>  <column name = 'C4', type = 'CHAR', length = 50><br>    Hello<br>  </column><br></row> |
| ... | ... | ... | <row><br>  <column name = 'C5', type = 'CHAR', length = 100><br>    Good<br>  </column><br>  <column name = 'C6', type = 'CHAR', length = 200><br>    Well<br>  </column><br></row> |

Figure 4:
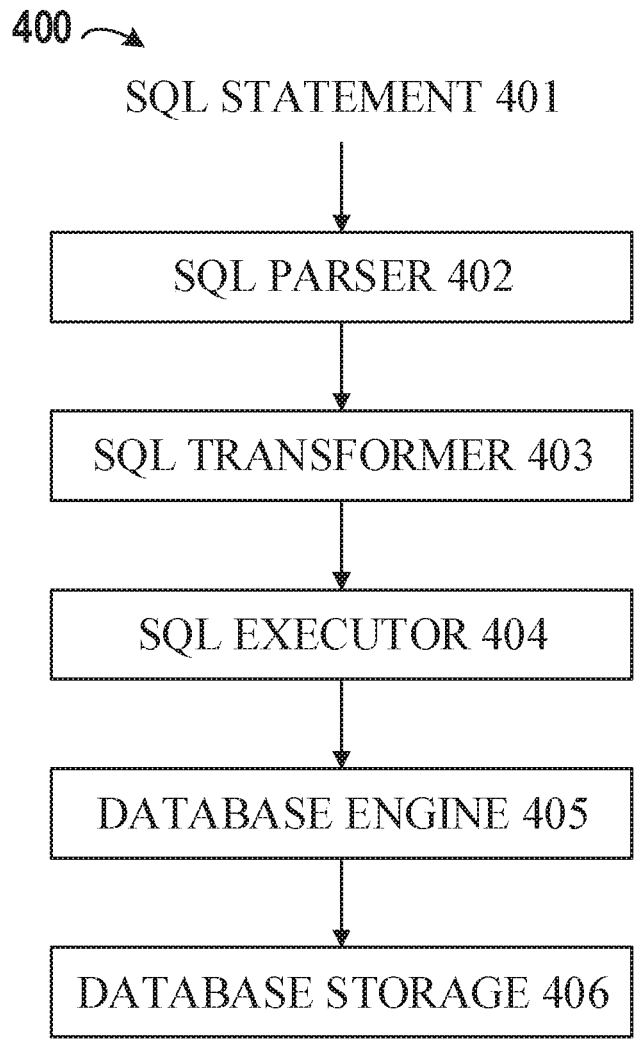
FIG. 4 illustrates a block diagram of a system 400 for manipulating a table with an XML column in a database according to an embodiment of the present disclosure.

FIG. 4 illustrates a block diagram of a system 400 for manipulating a table with an XML column in a database according to an embodiment of the present disclosure. The system 400 is a hybrid database system which support operation for both relational databases and XML databases. The system 400 comprises a SQL parser 402, a SQL transformer 403, a SQL executor 404, a database engine 405 and a database storage 406. In some embodiments, a SQL statement 401 for a table with an XML column which involves at least one logical column in the table, is received by the SQL parser 402. The SQL statement 401 can be from a database application or from a user directly. The information comprised in the SQL statement 401 will be described in detail later. The SQL parser 402 can parse the SQL statement and can determine whether the SQL statement relates to at least one logical column in the table based on both the SQL statement 401 and a schema of the table. If the SQL statement involves at least one logical column in the table, then the SQL transformer 403 can transform the SQL statement into a hybrid statement which is input into the SQL executor 404 for executing. During execution, the SQL executor 404, alternatively, may employ a cost-based optimization strategy whereby a cost effective way to execute the hybrid statement is chosen. Both the SQL executor 404 and the database engine 405, which support both standard SQL and XQuery, can get data from the table with the XML column stored in the database storage 406 in a single I/O operation. And the database storage 406 can be a storage platform exposing rich metadata that is embedded in one table, which can support the storage for such a table like Table 2 by saving at least one element in the XML column and values in other columns of the table in the same table space in the database storage 406 instead of storing the XML column in a single entity.

It can be understood that the system structure in FIG. 4 is illustrated and described herein as a series of system representative of various system structure, the subject innovation is not limited by the illustrated system structure. For instance, the SQL parser 402, the SQL transformer 403, and the SQL executor 404 can be three sub-components of the database engine, which depend on the design of the database. In addition, not all illustrated blocks or components may be required for the system in accordance with the subject innovation. Moreover, it will be appreciated that the example system and other systems according to the innovation may be designed in association with the system illustrated and described herein, as well as in association with other systems and apparatus not illustrated or described.

Figure 5:
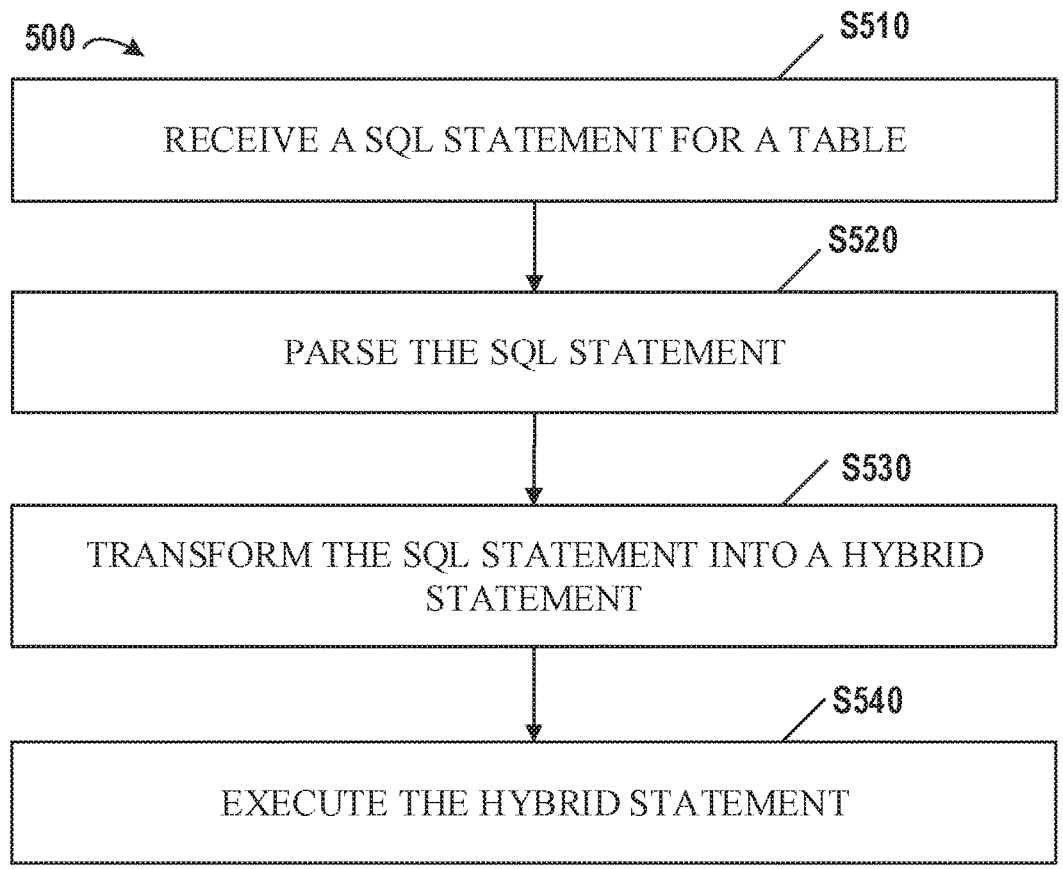
FIG. 5 depicts a schematic flowchart of a method for manipulating a table with an XML column in a database according to an embodiment of the present disclosure.

FIG. 5 depicts a schematic flowchart of a method for manipulating a table with an XML column in a database according to an embodiment of the present disclosure. While the example method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the present disclosure. Moreover, it will be appreciated that the example method and other methods according to the innovation may be implemented in association with the method illustrated and described herein, as well as in association with other systems and apparatus not illustrated or described.

Referring to FIG. 5 now, at step S510, a SQL statement for a table can be received by the SQL parser 402. There is an XML column in the table, and the XML column is a representation of a plurality of logical columns of the table. And each of elements of the XML column corresponds to a non-null value in a logical column.

At step S520, the SQL statement is parsed by the SQL parser 403. The SQL parser 403 is an extended SQL parser compared with the existing SQL parser, because whether the SQL statement relates to at least one logical column can be determined in the SQL parser 403. The determination is based on the schema of the table defined by Data Definition Language (DDL) in a previous SQL statement or imported from other databases, where relationship between the plurality of logical columns and the XML column is recorded in the schema.

At step S530, if the parsing result indicates that the SQL statement relates to at least one logical column, the SQL transformer 403 can transform the SQL statement into a hybrid statement, which is a composition of part of the SQL statement and an XML expression. In some cases, the hybrid statement is a composition of a SQL query and an XQuery.

At step S540, the SQL executor 404 can execute the hybrid statement to get results of the hybrid statement through the data engine 405 from the database storage 406. During the execution, the data engine 405 can access more pages from the database storage 406 by a single I/O operation without the JOIN operations. Therefore, the query efficiency can be increased for database compared with the existing solution.

The SQL statement is an extended SQL statement as at least one indicator indicating that a column is a logical column is included in some Data Definition Language (DDL, which is a subset of SQL) of the table, while most SQL statements are the same as the existing SQL statements. And the SQL transformation is transparent to users, so most existing database applications or existing database queries are not necessary to be re-written which can save a lot of efforts of database application developers or database administrators.

In some embodiments, if a SQL statement is related to a table definition process, e.g. creating a table, and the table comprises a plurality of logical columns, the plurality of logical columns needs to be identified first during parsing. In an example, the SQL statement related to a table definition process can be as below:
CREATE TABLE TAB
(C1 INT, C2 CHAR(5), C3 VARCHAR(10), C4 CHAR(50) Extended, C5 CHAR(100) Extended);
where two indicators "Extended" indicate columns C4 and C5 are logical columns, it can be understood that other indicators can be used instead. The SQL parser 402 may receive and parse the above SQL statement and determine that the SQL statement (e.g. C4 CHAR(50) Extended, C5 CHAR(100) Extended) are related to creating a table and relates to two logical columns C4 and C5, then the SQL transformer 403 may obtain the two logical columns C4 and C5, and modify the two logical columns C4 and C5 in the SQL statement into an XML column in the hybrid statement, e.g. the SQL transformer 403 may transform the SQL statement into the following hybrid statement:
CREATE TABLE TAB
(C1 INT, C2 CHAR(5), C3 VARCHAR(10), Col XML XML(C4 CHAR(50), C5 CHAR(100)));
The above hybrid statement is just for example purposes, other DDL can be designed instead of the above format. The database engine 406 can create a schema of the table TAB during the SQL executor 404 executes the hybrid statement, and the schema of table TAB can be (C1 INT, C2 CHAR(5), C3 VARCHAR(10), XML_Col XML(C4 CHAR(50), C5 CHAR(100)). And it can be understood that the relationship between the plurality of logical columns and the XML column is reserved in the schema, e.g., column XML_Col is an XML column, and the column XML_Col comprises two logical columns C4 and C5. The database engine 406 can be designed to execute the hybrid statement to make it possible to create a table with an XML column comprising at least one logical columns and also to make it possible to store the at least one XML element in the XML column and values in other columns of the table in the same table space in the database storage 406.

In some embodiments, the SQL statement may be related to altering at least one logical column of the table. In an example, the SQL statement related to the above table altering process can be as below:
ALTER TALE TAB
ADD COLUMN C6 CHAR(200) Extended;
where an indicator "Extended" indicates a column C6 is a logical column, it can be understood that other indicators can be used instead. The SQL parser 402 may receive and parse the above SQL statement. It can be determined that the SQL statement (e.g. C6 CHAR(200) Extended) relates to altering a logical columns C6 of the table TAB. Then the SQL transformer 403 may modify a column name of the related logical column of the table in the SQL statement into a corresponding name of the XML column in the hybrid statement, in this example, the SQL transformer 403 may transform the SQL statement to following hybrid statement:
ALTER TALE TAB
ADD COLUMN Col XML XML(C6 CHAR(200));
The above hybrid statement is just for example purpose, other DDL can be designed instead of the above format. The database engine 406 can modify the schema of the table TAB during the SQL executor 404 executes the hybrid statement, and the modified schema of table TAB can be (C1 INT, C2 CHAR(5), C3 VARCHAR(10), XML_Col XML(C4 CHAR (50), C5 CHAR(100) , C6 CHAR(200)), which shows that the column XML_Col is an XML column, and the column XML_Col comprises three logical columns C4, C5 and C6. The database engine 406 can be designed to execute the hybrid statement to make it possible to alter the table with an XML column comprising at least one logical columns and make it possible to alter the at least one XML element in the XML column of the table in the database storage 406.

Indexes on tables play a significant role in reducing the cost of access to data in tables. In some embodiments, the parser 402 can determine whether the SQL statement related to at least one logical column comprises a clause INDEX for the at least one logical column. An example SQL statement is shown as below:

Create Index IDX

ON TAB (C1, C4);

The SQL parser 402 may receive and parse the above SQL statement. Then it is determined that the SQL statement relates to the logical column C4 based on the schema of the table TAB (C1 INT, C2 CHAR(5), C3 VARCHAR(10), XML_Col XML(C4 CHAR(50), C5 CHAR(100) , C6 CHAR(200)) and the SQL statement comprises the clause INDEX for the logical column C4. Then the SQL transformer 403 may modify the SQL statement into the following hybrid statement comprising an XML index function in which an XPath is added to specify which data from XML elements is used for index construction, e.g. used as an index key of the XML index:

Create Index IDX

ON TAB(C1, "XML_COL")

"Generate Key Using XML_COL"

"XML Pattern '/row/column[@name="C4"]'"

Where the '/row/column[@name="C4"]' is the XPath to specify which data from XML elements is used for index key construction. The quoted part in the SQL statement is modified into corresponding XML expression with quotes in the hybrid statement. Then the SQL executor 404 can execute the above hybrid statement by creating a hybrid index on column C1 and the logical column C4. In order to get the hybrid index during the SQL executor 404 executes the hybrid statement, a first index can be generated using the existing relational database technologies, and each entry in the first index includes row value in the general column (C1) and row ID of a row. Then a second index can be generated using existing XML database technology, and each entry in the second index includes XML value in at least one logical column (C4) and row ID of a row. The hybrid index can be generated by combining the first index and the second index using the shared row ID. Thus, each entry of the hybrid index can be [row value in the general column, XML value in at least one logical column, row ID of a row], which can still be represented by B+ tree in database storage 406, similar to the first index and the second index.

The above two hybrid statements need to be understood and executed by the SQL executor 404 and the database engine 405. In other words, the SQL executor 404 and the database engine 405 can execute existing SQL query and XQuery.

In some embodiments, if the parser 402 can determine that the SQL statement related to at least one logical column comprises at least one of following SQL clause or clause group: INSERT, SELECT, WHERE, UPDATE and SET, GROUP BY, GROUP BY and HAVING, and ORDER BY, then the SQL transformer 403 can modify related part of the SQL statement into a corresponding XML expression in the hybrid statement. The transformation will be described in detail herein.

In some embodiments, the SQL statement related to at least one logical column may comprise clause INSERT as below:

INSERT INTO TAB(C1, C2, C3, "C4")

VALUES(1, 'ABC', 'DEF, "'Hello'");

The SQL parser 402 may receive and parse the above SQL statement. Then it is determined that the SQL statement relates to the logical columns C4 based on the schema of the table TAB (C1 INT, C2 CHAR(5), C3 VARCHAR(10), XML_Col XML(C4 CHAR(50), C5 CHAR(100) , C6 CHAR(200)). At last, the SQL transformer 403 may modify the clause INSERT in the SQL statement into a clause INSERT with XML format in the hybrid statement as below:

INSERT INTO TAB(C1, C2, C3, "XML_Col)

VALUES (1, ''ABC, 'Hello',

```
<row>
    <column name = 'C4', type = 'CHAR', length = 50>
        Hello
    </column>
</row>' )"
```

Where the quoted part in the SQL statement is modified into corresponding XML expression with quotes in the hybrid statement. Then the database engine 406 can insert the above values into the table TAB during the SQL executor 404 executes the hybrid statement.

In some embodiments, the SQL statement related to at least one logical column may comprise the clause SELECT, or clause group SELECT and GROUP BY, or clause group SELECT and ORDER BY, the related part of the SQL statement can be modified into an XMLQuery function or an XMLTable function in the hybrid statement. For example, the SQL statement is shown below:

SELECT C1, C2, "C6"

FROM TAB

WHERE C3='DEF'

The SQL parser 402 may receive and parse the above SQL statement. Then it is determined that the SQL statement relates to the logical columns C6 based on the schema of the table TAB. If the SQL transformer 403 may modify the related part of the SQL statement into the XMLQuery function, then the hybrid statement can be shown as the following:

SELECT C1, C2,

"XMLQuery('$Doc/row/column[@name="C6"]'

Passing BY REF TAB.XML_Col as Doc)

FROM TAB

WHERE C3='DEF'"

Where "$Doc/row[column[" is an Xpath, and "Passing BY REF TAB.XML_Col as "Doc"" provides what is Doc in the Xpath. The quoted part in the SQL statement is modified into a corresponding XML expression with quotes in the hybrid statement. Then the SQL executor 404 can execute the above hybrid statement with existing database technology.

In another example, the SQL statement is shown below:

SELECT C1, C2, C5, C6

FROM TAB

WHERE C3='DEF'

And if the SQL transformer 403 may modify the related part of the SQL statement into the XMLTable function, then the hybrid statement can be shown as the following:
SELECT C1, C2, X.Col_C5, X.Col_C6
FROM TAB, XMLTABLE('$Doc/row' Passing BY REF TAB.XML_Col as "Doc"
   COLUMNS
   Col_C5 CHAR(100) PATH 'column[@name="C5"]',
   Col_C6 CHAR(100) PATH 'column[@name="C6"]')
   AS X
WHERE C3='DEF'
Where 'column[@name="C5"]' provides Xpath of X.Col_C5, and 'column[@name="C6"]' provides Xpath of X.Col_C6. The hybrid statement can be executed by the SQL executor 404 and database engine 405 with the existing database technologies.

In another example, if the SQL statement is shown as below:
SELECT C1, C6
FROM TAB
WHERE C3='DEF
ORDER BY/GROUP BY C5
Then the modified hybrid statement can be transformed into following:
SELECT C1, X.Col_C6
FROM TAB, XMLTABLE('$Doc/row' Passing BY REF TAB.XML_Col as "Doc"
   COLUMNS
   Col_C5 CHAR(100) PATH 'column[@name="C5"]',
   Col_C6 CHAR(100) PATH 'column[@name="C6"]')
   AS X
WHERE C3='DEF'
ORDER BY/GROUP BY X.Col_C5
Then the SQL executor 404 and database engine 405 can execute the above hybrid statement with the existing database technologies.

If the XMLTable function is used for multiple logical columns, the XML documents may be accessed once, and temporary results have to be stored in memory. However, if the XQuery function is used for multiple logical columns, the XML documents may be accessed multiple times. And which XML function from both the XQuery function and the XMLTable function can be selected is based on predicted costs of queries execution. In some embodiments, the SQL executor 404 may comprise a sub-component referred as a SQL optimizer (not shown in FIG. 4) which can estimate costs of two candidate hybrid statements using the XQuery function and the XMLTable function to select the one with lower cost.

In some embodiments, the SQL statement related to at least one logical column may comprise the clause WHERE or the clause HAVING, the related part of the SQL can be modified into an XMLExists function in the hybrid statement. For example, the SQL statement is shown as below:
SELECT C1, C2
FROM TAB
WHERE C3='DEF AND
   "C4 ='Hello'"
The SQL parser 402 may receive and parse the above SQL statement. Then it is determined that the SQL statement relates to the logical columns C4 based on the schema of the table TAB. At last, the SQL transformer 403 may modify the SQL statement into the following hybrid statement:
SELECT C1, C2
FROM TAB
WHERE C3='DEF' AND
   "XMLExists('$Doc/row[column[@name="C4"]
   ="Hello"]'
      Passing BY REF TAB.XML_Col as "Doc")"
The quoted part in the SQL statement is modified into corresponding XML expression with quotes in the hybrid statement. Then the SQL executor 404 and database engine 405 can execute the above hybrid statement with the existing database technologies.

In another example, if the SQL statement is shown as below:
SELECT MAX(C1)
FROM TAB
GROUP BY C5
HAVING C4='HELLO'
Then the SQL statement can be transformed into following:
SELECT MAX(C1)
FROM TAB, XMLTABLE('$Doc/row' Passing BY REF TAB.XML_Col as "Doc"
   COLUMNS
   Col_C5 CHAR(100) PATH 'column[@name="C5"]')
   AS X
GROUP BY X.Col_C5,
HAVING  XMLExists('$Doc/row[column[@name="C4"]
="Hello"]'
   Passing BY REF TAB.XML_Col as "Doc")
Then the SQL executor 404 and database engine 405 can execute the above hybrid statement with the existing database technologies.

In some embodiments, the SQL statement related to at least one logical column may comprise the clause group UPDATE and SET (the two clauses always appear in pairs in a single SQL statement), the related part of the SQL can be modified into an XMLModify function in the hybrid statement. For example, the SQL statement is shown below:
UPDATE TAB
"SET C6='OK'"
WHERE C3='DEF'
The SQL parser 402 may receive and parse the above SQL statement. Then it is determined that the SQL statement relates to the logical columns C6 based on the schema of the table TAB. At last, the SQL transformer 403 may modify the SQL statement to the following hybrid statement:
UPDATE TAB
"XML_Col=XMLModify ('Replace Value of Node
   /row/column[@name=C6] With "OK"')"
WHERE C3='DEF'
Where quoted part in the SQL statement is modified into a corresponding XML expression with quotes in the hybrid statement. Then the SQL executor 404 can execute the above hybrid statement with the existing database technologies.

In some embodiments, the SQL statement related to at least one logical column may comprise the clause GROUP BY/ORDER BY, the related part of the SQL can be modified into the XMLQuery function or the XMLTable function in the hybrid statement. For example, the SQL statement is shown as below:
SELECT C1, C6
FROM TAB
WHERE C3='DEF
ORDER BY/GROUP BY C5
Then the modified hybrid statement can be shown as below:
SELECT C1, X.Col_C6
FROM TAB, XMLTABLE('$Doc/row' Passing BY REF TAB.XML_Col as "Doc"

COLUMNS
    Col_C5 CHAR(100) PATH 'column[@name="C5"]',
    Col_C6 CHAR(100) PATH 'column[@name="C6"]')
    AS X
WHERE C3='DEF'
ORDER BY/GROUP BY X.Col_C5

Then the SQL executor 404 can execute the above hybrid statement with the existing database technologies.

It can be understood that the any combination of above SQL clauses or clause groups can be used in the SQL statement. The SQL statement can be transformed into the hybrid statement by any combination of the above rules, for example, the SQL statement is shown below:
SELECT C1, C2, C6
FROM TAB
WHERE C3='DEF AND
    C5='Good'

Then the transformed hybrid statement is shown below:
SELECT C1, C2,
    XMLQuery('$Doc/row/column[@name="C6"]'
        Passing BY REF TAB.XML_Col as Doc)
FROM TAB
WHERE C3='DEF' AND
    XMLExists('$Doc/row[column[@name="C5"]
        ="Good"]'
        Passing BY REF TAB.XML_Col as "Doc")

Then the SQL executor 404 can execute the above hybrid statement with the existing database technologies.

It can be understood that any one logical column can be defined as a "foreign key'instead of "Primary key". For example, following SQL statement can be permitted.
CREATE TABLE TAB_1
(C1 INT, C2 CHAR(5), C3 VARCHAR(10),
C6 CHAR(200) Extended
Foreign Key(C6) Reference TAB_1(C1));
But the following SQL statement cannot be permitted.
CREATE TABLE TAB_2
(C1 INT, C2 CHAR(5), C3 VARCHAR(10),
C4 CHAR(50) Extended, C5 CHAR(100) Extended
Primary Key(C5));

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to improve performance of database storage queries through optimization of a database storage for a plurality of logical columns by utilizing only non-null values in XML elements, the computer-implemented method comprising:
   reorganizing, by one or more processors, a portion of the plurality of logical columns of a table in the database storage as an XML column of the table, wherein each logical column from the portion of the plurality of logical columns includes a plurality of null values and a plurality of non-null values, wherein the portion of the plurality of logical columns is a subset of logical columns from the plurality of logical columns;
   creating, by one or more processors, a new table with a remaining portion of the plurality of logical columns and the XML column for the portion of the plurality of logical columns of the table, wherein creating the XML column consolidates each logical column from the portion of the plurality of logical columns to only include the plurality of non-null values;
   receiving, by one or more processors, an SQL statement for the new table, wherein there is at least one XML element in at least one row and in the XML column of the new table, and each of the at least one XML element corresponds to a single non-null value from the plurality of non-null values in a specific row and in a logical column of the portion of the plurality of logical columns of the table;
   parsing, by one or more processors, the SQL statement;
   transforming, by one or more processors, the SQL statement into a hybrid statement that is able to process the at least one XML element in response to the parsing result indicating that the SQL statement relates to at least one logical column of the plurality of logical columns; and
   executing, by one or more processors, the hybrid statement by accessing a plurality of pages with the plurality of logical columns of the new table from the database storage with a single I/O operation and omitting one or more JOIN operations for the plurality of logical columns of the new table.

2. The method of claim 1, wherein the at least one XML element in the XML column and values in other columns of the new table are stored in a same table space in the database storage.

3. The method of claim 1, wherein a relationship between the plurality of logical columns and the XML column is stored in a schema of the new table, and wherein the parsing of the SQL statement further comprises:
   determining, by one or more processors, that the SQL statement relates to at least one logical column of the plurality of logical columns based on the schema of the new table.

4. The method of claim 1, wherein the hybrid statement is a composition of part of the SQL statement and an XML expression in response to the SQL statement being further related to at least one of following SQL clauses or clause group: INSERT, SELECT, WHERE, UPDATE and SET, GROUP BY, GROUP BY and HAVING, and ORDER BY.

5. The method of claim 4, wherein the XML expression is further obtained using at least one of following:
   modifying, by one or more processors, the clause INSER in the SQL statement into a clause INSERT with XML format in the hybrid statement;
   modifying, by one or more processors, the clause SELECT, clause group SELECT and GROUP BY, or clause group SELECT and ORDER BY in the SQL statement into an XMLQuery function or an XMLTable function in the hybrid statement;
   modifying, by one or more processors, clause group UPDATE and SET in the SQL statement into an XMLModify function in the hybrid statement; and
   modifying, by one or more processors, the clause WHERE or the clause HAVING in the SQL statement into an XMLExists function in the hybrid statement.

6. The method of claim 1, wherein the transforming the SQL statement into a hybrid statement comprises:
   modifying, by one or more processors, an index definition in the SQL statement into an XML, index function in the hybrid statement, wherein an Xpath is included in the XML, index function to specify which data from the XML column is used for an index key in the XML index.

7. The method of claim 6, wherein a hybrid index for the new table is built in response to the execution of the hybrid statement comprising the XML index function, and wherein an entry of the hybrid index for the new table comprises row values in the other columns of the new table, XML value and row ID.

8. The method of claim 3, wherein the transforming the SQL statement into a hybrid statement comprises:
   in response to the parsing result further indicating that the SQL statement being related to creating the new table, obtaining, by one or more processors, the at least one logical column of the new table from the SQL statement, wherein each of the at least one logical column is indicated by an indicator in the SQL statement; and
   modifying, by one or more processors, a column name of the related logical column of the new table in the SQL statement into a corresponding name of the XML column in the hybrid statement;
   wherein the schema of the new table is created during the execution of the hybrid statement.

9. The method of claim 8, wherein the transforming the SQL statement into a hybrid statement comprises:
   in response to the parsing result further indicating that the SQL statement being related to altering at least one logical column of the new table, obtaining, by one or more processors, the at least one logical column of the new table to be altered in the SQL statement, wherein each of the at least one logical column is indicated by an indicator in the SQL statement; and
   modifying, by one or more processors, the at least one logical column of the new table in the SQL statement into the XML column related to the at least one logical column of the new table to be altered in the hybrid statement;
   wherein the schema of the new table is altered during the execution of the hybrid statement.

10. A system to improve performance of database storage queries through optimization of a database storage for a plurality of logical columns by utilizing only non-null values in XML elements, the system comprising:
    one or more processors;
    a memory coupled to at least one of the processors; and
    a set of computer program instructions stored in the memory and executed by at least one of the processors in order to perform actions of:
    reorganizing, by one or more processors, a portion of the plurality of logical columns of a table in the database storage as an XML column of the table, wherein each logical column from the portion of the plurality of logical columns includes a plurality of null values and a plurality of non-null values, wherein the portion of the plurality of logical columns is a subset of logical columns from the plurality of logical columns;
    creating, by one or more processors, a new table with a remaining portion of the plurality of logical columns and the XML column for the portion of the plurality of logical columns of the table, wherein creating the XML column consolidates each logical column from the portion of the plurality of logical columns to only include the plurality of non-null values;
    receiving, by one or more processors, an SQL statement for the new table, wherein there is at least one XML element in at least one row and in the XML column of the new table, and each of the at least one XML element corresponds to a single non-null value from the plurality of non-null values in a specific row and in a logical column of the portion of the plurality of logical columns of the table;
    parsing, by one or more processors, the SQL statement;
    transforming, by one or more processors, the SQL statement into a hybrid statement that is able to process the at least one XML element in response to the parsing result indicating that the SQL statement relates to at least one logical column of the plurality of logical columns; and
    executing, by one or more processors, the hybrid statement by accessing a plurality of pages with the plurality of logical columns of the new table from the database storage with a single I/O operation and omitting one or more JOIN operations for the plurality of logical columns of the new table.

11. The system of claim 10, wherein the at least one XML element in the XML column and values in other columns of the new table are stored in a same table space in the database storage.

12. The system of claim 10, wherein a relationship between the plurality of logical columns and the XML column is stored in a schema of the new table, and wherein the parsing the SQL statement comprises:
    determining that the SQL statement relates to at least one logical column of the plurality of logical columns based on the schema of the new table.

13. The system of claim 10, wherein the hybrid statement is a composition of both part of the SQL statement and an XML expression in response to the SQL statement being further related to at least one of following SQL clauses or clause group: INSERT, SELECT, WHERE, UPDATE and SET, GROUP BY, GROUP BY and HAVING, and ORDER BY.

14. The system of claim 13, wherein the XML expression is further obtained using at least one of following:
    modifying the clause INSER in the SQL statement into a clause INSERT with XML format in the hybrid statement;
    modifying the clause SELECT, clause group SELECT and GROUP BY, or clause group SELECT and ORDER BY in the SQL statement into an XMLQuery function or an XMLTable function in the hybrid statement;
    modifying the clause group UPDATE and SET in the SQL statement into an XMLModify function in the hybrid statement; and
    modifying the clause WHERE or the clause HAVING in the SQL statement into an XMLExists function in the hybrid statement.

15. The system of claim 10, wherein the transforming the SQL statement into a hybrid statement comprises:
    modifying an index definition in the SQL statement into an XML, index function in the hybrid statement, wherein an Xpath is included in the XML index function to specify which data from the XML column is used for an index key of the XML index; and
    wherein a hybrid index for the new table is built in response to the execution of the hybrid statement comprising the XML index function, and wherein an entry of the hybrid index for the new table comprises row values in the other columns of the new table, XML value and row ID.

16. A computer program product to improve performance of database storage queries through optimization of a database storage for a plurality of logical columns by utilizing only non-null values in XML elements, the computer program product comprising a computer readable storage medium having program instructions embodied therewith, the program instructions executable by a processor to cause the processor to:
  reorganize a portion of the plurality of logical columns of a table in the database storage as an XML column of the table, wherein each logical column from the portion of the plurality of logical columns includes a plurality of null values and a plurality of non-null values, wherein the portion of the plurality of logical columns is a subset of logical columns from the plurality of logical columns;
  create a new table with a remaining portion of the plurality of logical columns and the XML column for the portion of the plurality of logical columns of the table, wherein creating the XML column consolidates each logical column from the portion of the plurality of logical columns to only include the plurality of non-null values;
  receive an SQL statement for the new table, wherein there is at least one XML element in at least one row and in the XML column of the new table, and each of the at least one XML element corresponds to a single non-null value from the plurality of non-null values in a specific row and in a logical column of the portion of the plurality of logical columns of the table;
  parse the SQL statement;
  transform the SQL statement into a hybrid statement that is able to process the at least one XML element in response to the parsing result indicating that the SQL statement relates to at least one logical column of the plurality of logical columns; and
  execute the hybrid statement by accessing a plurality of pages with the plurality of logical columns of the new table from the database storage with a single I/O operation and omitting one or more JOIN operations for the plurality of logical columns of the new table.

17. The computer program product of claim 16, wherein the at least one XML element in the XML column and values in other columns of the table are stored in a same table space in the database storage.

18. The computer program product of claim 16, wherein a relationship between the plurality of logical columns and the XML column is stored in a schema of the new table, and wherein the parse the SQL statement comprises:
  determine that the SQL statement relates to at least one logical column of the plurality of logical columns based on the schema of the new table.

19. The computer program product of claim 16, wherein the hybrid statement is a composition of both part of the SQL statement and an XML expression in response to the SQL statement being further related to at least one of following SQL clauses or clause group: INSERT, SELECT, WHERE, UPDATE and SET, GROUP BY, GROUP BY and HAVING, and ORDER BY.

20. The computer program product of claim 19, wherein the XML expression is further obtained by using at least one of following:
  modify the clause INSER in the SQL statement into a clause INSERT with XML format in the hybrid statement;
  modify the clause SELECT, clause group SELECT and GROUP BY, or clause group SELECT and ORDER BY in the SQL statement into an XMLQuery function or an XMLTable function in the hybrid statement;
  modify the clause group UPDATE and SET in the SQL statement into an XMLModify function in the hybrid statement; and
  modify the clause WHERE or the clause HAVING in the SQL statement into an XMLExists function in the hybrid statement.

\* \* \* \* \*